United States Patent
Tetzlaff et al.

(10) Patent No.: US 8,358,043 B2
(45) Date of Patent: Jan. 22, 2013

(54) ENHANCED THERMAL CONDUCTIVITY MATERIAL IN ANNULAR GAP BETWEEN ELECTRICAL MOTOR STATOR AND HOUSING

(75) Inventors: Steven K. Tetzlaff, Owasso, OK (US); Ketankumar K. Sheth, Tulsa, OK (US); John M. Knapp, Claremore, OK (US); Earl B. Brookbank, Claremore, OK (US); William F. Pranger, Claremore, OK (US); Thien Q. Tran, Broken Arrow, OK (US); Suresha R. O'Bryan, Joplin, MO (US)

(73) Assignee: Baker Hughes Incorporated, Houston, TX (US)

( * ) Notice: Subject to any disclaimer, the term of this patent is extended or adjusted under 35 U.S.C. 154(b) by 539 days.

(21) Appl. No.: 12/605,221

(22) Filed: Oct. 23, 2009

(65) Prior Publication Data
US 2010/0102648 A1    Apr. 29, 2010

Related U.S. Application Data

(60) Provisional application No. 61/108,378, filed on Oct. 24, 2008.

(51) Int. Cl.
*H02K 9/00* (2006.01)
*H02K 5/12* (2006.01)
(52) U.S. Cl. ............... 310/87; 310/89; 310/54; 310/58; 310/59; 166/105; 417/423.3; 417/423.5
(58) Field of Classification Search ............... 310/87, 310/89, 52, 54, 58–59, 64; 166/105; 417/423.3–423.5
See application file for complete search history.

(56) References Cited

U.S. PATENT DOCUMENTS

| | | | |
|---|---|---|---|
| 2,556,435 A | 6/1951 | Moehri et al. | |
| 3,242,360 A | 3/1966 | Carle | |
| 3,638,055 A * | 1/1972 | Zimmermann | 310/43 |
| 3,671,786 A | 6/1972 | Jones | |
| 4,191,240 A * | 3/1980 | Rule et al. | 165/79 |
| 4,286,185 A | 8/1981 | Erickson | |
| 4,679,313 A * | 7/1987 | Schultz et al. | 29/596 |
| 4,685,867 A | 8/1987 | Patun et al. | |
| 5,189,328 A | 2/1993 | Knox | |
| 6,181,038 B1 * | 1/2001 | Van Rooij | 310/89 |
| 6,794,788 B1 * | 9/2004 | Smith et al. | 310/254.1 |
| 6,956,310 B1 | 10/2005 | Knox | |
| 7,300,263 B2 * | 11/2007 | Mitsuda et al. | 417/423.7 |
| 7,492,069 B2 | 2/2009 | Knox et al. | |
| 8,037,936 B2 | 10/2011 | Neuroth et al. | |
| 2009/0269224 A1 | 10/2009 | Hunt et al. | |

FOREIGN PATENT DOCUMENTS

| | | |
|---|---|---|
| JP | 05-236705 A | 9/1993 |
| JP | 2001-169501 A | 6/2001 |
| JP | 2005-348474 A | 12/2005 |

* cited by examiner

*Primary Examiner* — Quyen Leung
*Assistant Examiner* — Leda Pham
(74) *Attorney, Agent, or Firm* — Bracewell & Giuliani LLP

(57) ABSTRACT

A submersible electric motor has feature to enhance thermal conductivity from the motor interior to the exterior. The motor has a cylindrical housing and a stator rigidly mounted within housing. A rotatable rotor is located within the stator. A gap formed between the stator's outer diameter and the inner wall of the housing is filled with a high thermal conductivity material to improve heat transfer from the motor. The remaining portion of the housing may be filled with a dielectric lubricant that has lesser thermal conductivity than the high thermal conductivity material.

26 Claims, 3 Drawing Sheets

US 8,358,043 B2

ENHANCED THERMAL CONDUCTIVITY MATERIAL IN ANNULAR GAP BETWEEN ELECTRICAL MOTOR STATOR AND HOUSING

CROSS-REFERENCE TO RELATED APPLICATION

This application claims priority to provisional application 61/108,378, filed Oct. 24, 2008.

FIELD OF THE INVENTION

This invention relates in general to submersible pump electric motors, and in particular to improving heat transfer in submersible electric motors via the introduction of high thermal conductivity material in the annular cavity formed between the housing and stator.

BACKGROUND OF THE INVENTION

Submersible electrical motors are typically used to drive submersible well pumps that may be used in oil well production. These motors generate heat that is preferably removed during operation to prevent overheating of the motor.

One method of removing the heat generated by the motor is filling the motor housing with a dielectric liquid or lubricant. The lubricant removes heat from motor components and transfers it to a motor housing. The motor housing may in turn transfer the heat to the well fluid in which it is immersed. However, the prior art lubricant in the housing generally does not have good thermal conductivity and is not very effective at removing the heat generated by the motor while it operates. Also, air pockets tend to exist in the housing, which also contributes to poor thermal conductivity. A motor's performance and life is thus poorly affected due to poor heat removal.

Thus enhanced heat transfer can extend the life of the motor due to the lower operating temperature. Further, if the motor's internal temperature is kept at the same operating temperature, the motor can reliably and efficiently operate in higher outside temperatures.

The fabrication of motors that operate reliably and effectively is desired. Current methods of removing heat from motors are ineffective. A need exists for a technique to enhance heat transfer in motors.

SUMMARY OF THE INVENTION

In an embodiment of the present invention, an electrical submersible motor with enhanced heat transfer is illustrated, with the motor comprising a rotor located within a stator. The rotor is carried by a shaft and can rotate within the stator in response to the application of electrical power to either or both of the rotor and stator. The motor also comprises a cylindrical housing within which the stator is rigidly mounted. During operation, the motor will generate heat that must be removed to protect the motor and maintain reliable performance.

A thin annular gap formed between the outer diameter of the stator and the inner diameter of the housing is filled with a thermal grease or high thermal conductivity material (HTCM). The grease is effective in removing heat from the motor so that the heat can be rejected to the well fluid. Analytical simulation shows that motor internal temperature can be decreased by at least 10 degrees by utilizing materials with improved thermal conductivity, such as HTCMs.

One example of a process for introducing the thermal grease into the annular gap is preferably performed before assembling and installing the rotor. The housing may be ported at both ends of the housing and seals may be positioned at the upper and lower ends of the stator to isolate the annular gap from the central cavity of the stator. A vacuum can be attached to one port to evacuate the housing and then the thermal grease source can be connected to the other port. The thermal grease can then be introduced into the annular gap via the port until the gap in the housing is filled. The port connected to the thermal grease source is then sealed and the seals at the upper and lower ends of stator removed. Subsequently the rotor may then be installed and the housing may then be filled with lubricant dielectric liquid, which is able to contact the thermal grease but does not displace it from the annular gap. In other examples, however, the lubricant itself may constitute an HTCM.

DETAILED DESCRIPTION OF THE INVENTION

Figure 1:
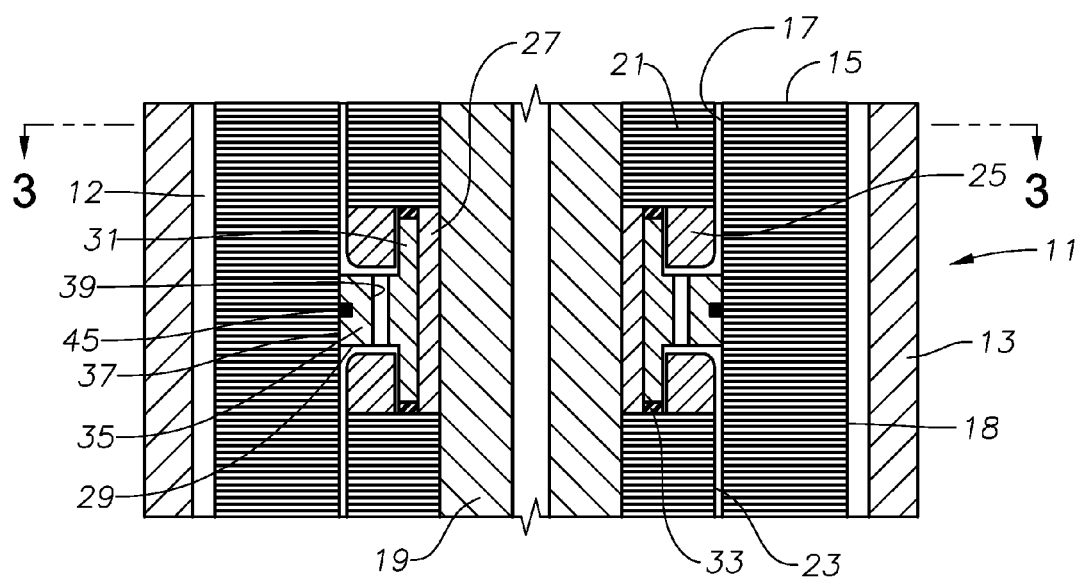
FIG. 1 is a axial sectional view of a portion of a motor assembly constructed in accordance with the invention.

Referring to FIG. 1, a submersible electric motor 11 includes a cylindrical housing 13. A stator 15 is rigidly mounted within housing 13. Stator 15 is constructed of a large number of flat disks, called laminations, each having slots 16 (FIG. 3) through which wires (not shown) are wound in a conventional manner. The disks of the stator 15 may be fabricated from magnetic steel, brass, bronze, or a combination thereof. The disks of the stator 15 may be insulated from each other by conventional coatings. The stator 15 has an inner diameter or wall 17 and an outer diameter or wall 18 that are of uniform constant diameter. A conventional locking system may be employed to prevent rotation of stator 15 within housing 13.

A shaft 19 carries a rotor 21 that rotates within the stator inner wall 17. The rotor 21 is also formed of flat laminations. A portion of two sections of rotor 21 are shown. Each section of rotor 21 terminates in an end ring 25. Each section of rotor 21 is secured by a key (not shown) to shaft 19 to cause rotors 21 to rotate with shaft 19.

A bearing assembly is located between each of the sections of rotor 21 to radially stabilize shaft 19. A variety of bearing assemblies may be employed. In this example, the bearing assembly includes a bushing 27 that is secured to shaft 19 for rotation therewith by means of a key (not shown). Bushing 27 is preferably a bronze cylinder and is not axially locked to shaft 19. The upper edge or circular rim of bushing 27 contacts the lowermost portion of the rotor 21 section directly above. The lower edge of inner bushing 27 contacts the uppermost portion of the rotor 21 section directly below. Inner bushing 27 supports the weight of the sections of rotor 21 above and transmits any downward force on sections of rotor 21 located above to sections of rotor 21 located below.

A hub 31 locates within the inner bore of each end ring 25. Hub 31 slidingly receives the inner bushing 27. Hub 31 is cylindrical and has less length than inner bushing 27. Hub 31 is preferably steel, and may be magnetic.

A thrust washer 33 is located around the outer diameter of inner bushing 27 and between the section of rotor 21 directly above and the upper edge of hub 31. A similar thrust washer 33 is located between the lower edge of hub 31 and the section of rotor 21 directly below. Thrust washers 33 are preferably of a nonmetallic material, such as a glass reinforced phenolic material. The distance from the lower side of the lower thrust washer 33 to the upper side of the upper thrust washer 33 is about 1/32 inch less than the height of the bushing 27. This prevents the thrust washers 33 from bearing the weight of the sections of rotor 21 located above.

Bearing body 29 has a flange or outer portion 35 that extends radially outward from hub 31. Outer portion 35 has a cylindrical periphery 37 that is spaced inward from the inner wall 17 of the stator 15 by a clearance of about 0.003 to 0.005 inch on the diameter. The longitudinal thickness or height of the outer portion 35 is less than the distance between the two adjacent end rings 25. A plurality of passages 39 extend through the outer portion 35 for communicating with the contents in the housing 13. Bearing body 29 is normally of a metallic material, preferably nitralloy. An elastomeric band 45 is located in a groove around the cylindrical periphery 37 of the bearing body 29.

Figure 2:
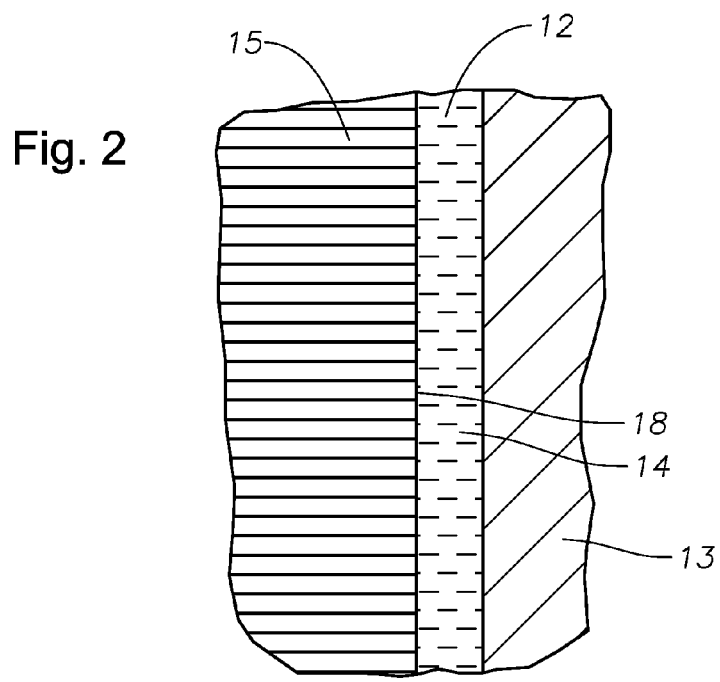
FIG. 2 is an enlarged axial sectional view of the annular gap between the motor housing inner diameter and the stator outer diameter of the motor assembly of FIG. 1 and filled with a thermally conductive fluid in accordance with the invention.
Figure 3:
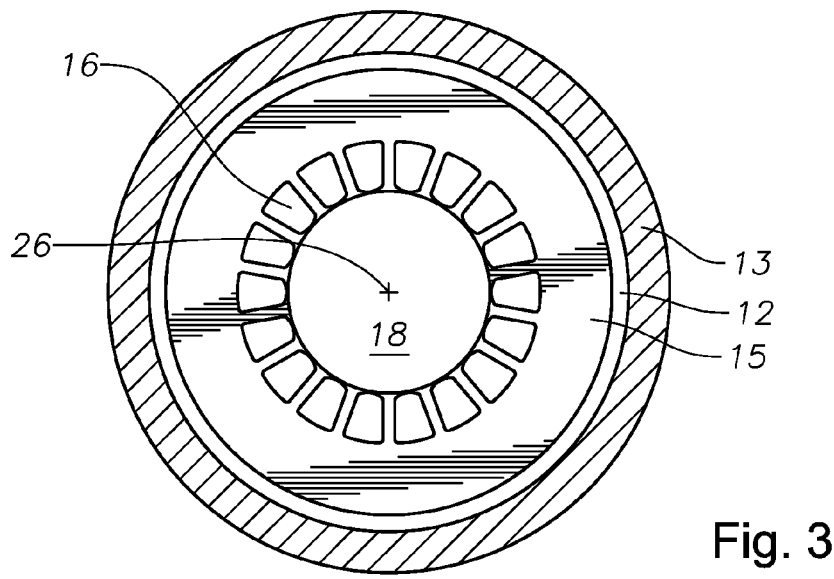
FIG. 3 is a transverse sectional view of the motor of FIG. 1, taken along the line 3-3 of FIG. 1 and showing the motor housing, stator, gap, and winding slots, in accordance with the invention.

Referring to FIGS. 2 and 3 a gap 12 is formed between the stator 15 outer wall 18 and the housing 13 inner diameter. The gap 12, which is greatly exaggerated in size in the drawings, is preferably about 0.002 to 0.008 inch on the diameter but could also be less than 0.002 inches. Gap 12 thus has a radial width between the outer diameter of stator 15 and the inner diameter of housing 13 that is from about 0.0001 to 0.020 inch. HTCM 14 or other high thermal conductivity material (HTCM) 14 is contained in the gap 12. HTCM 14 may have a thermal conductivity in a range from 0.4 to 10 Btu/(hr·ft·° F.). The range for the HTCMs' thermal conductivity may further be described as being greater than 0.4 Btu/(hr·ft·° F.), greater than 1.0 Btu/(hr·ft·° F.), or greater than 5.0 Btu/(hr·ft·° F.). In one embodiment, the remaining cavities formed by the motor housing 13 and the interior portions of the motor 11 are filled with a conventional dielectric liquid lubricant or lubricating oil. The conventional lubricant would have a lesser thermal conductivity than the HTCM 14. Alternatively, by improving the thermal properties of the lubricating oil with additives to increase heat transfer, the lubricating oil would then function as the HTCM 14 and could then be used not only in the gap 12, but throughout the motor 11.

Figure 4:
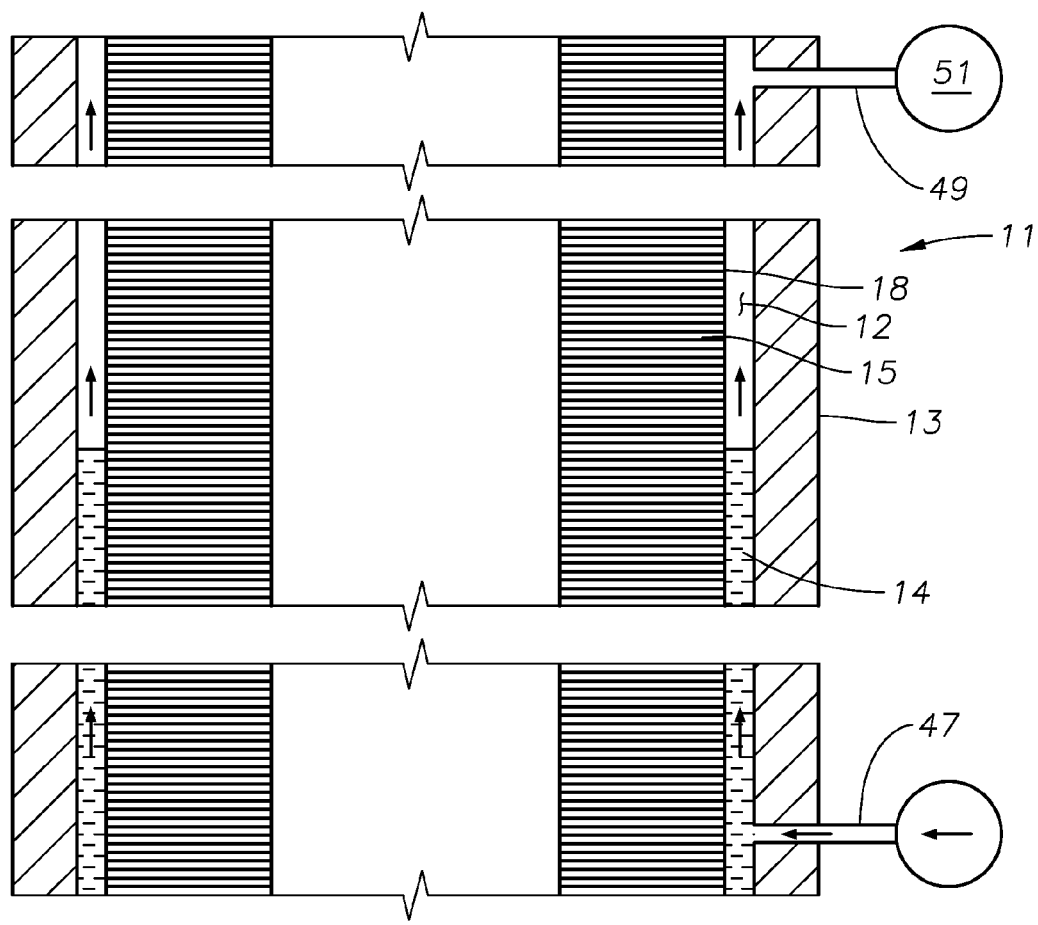
FIG. 4 is a axial sectional view of the motor assembly of FIG. 1, showing a method by which the annular gap is evacuated and filled with a thermally conductive fluid, in accordance with the invention.

FIG. 4 illustrates one process for introducing HTCM 14 into the gap 12 formed between the inner diameter of the housing 13 and the outer wall 18 of the stator 15. This process is preferably performed before assembling and installing rotor 21. The housing 13 is ported at both ends of the housing 13. Temporary seals or plugs (not shown) are positioned at the upper and lower ends of central cavity 17 in stator 15 to isolate gap 12 from the central cavity 17 of stator 15. A vacuum 51 is attached at a port 49 and operated to evacuate annular gap 12. After annular gap 12 is evacuated, a HTCM 14 source is connected to port 47. HTCM 14 is typically much more viscous than conventional dielectric lubricants used in motors 11, but should be capable of flowing into gap 12 with vacuum filling techniques. The HTCM 14 is introduced into the gap 12 until the gap 12 in the housing 13 is filled. The port 47 is then sealed and the seals or plugs at the upper and lower ends of central cavity 17 of stator 15 are removed. Subsequently rotor 21 is installed in central cavity 17 and housing 13 is filled with lubricant in a conventional manner. The conventional lubricant is able to contact HTCM 14 at the upper and lower ends of annular gap 12 but does not displace it from gap 12. Preferably an interface contact will remain between HTCM 14 and the motor lubricant as the top and bottom of annular gap 12. Alternatively, where the lubricating oil itself functions as the HTCM 14 to be used throughout the motor 11, isolation of gap 12 from the central cavity 17 of stator 15 is not required.

Figure 6:
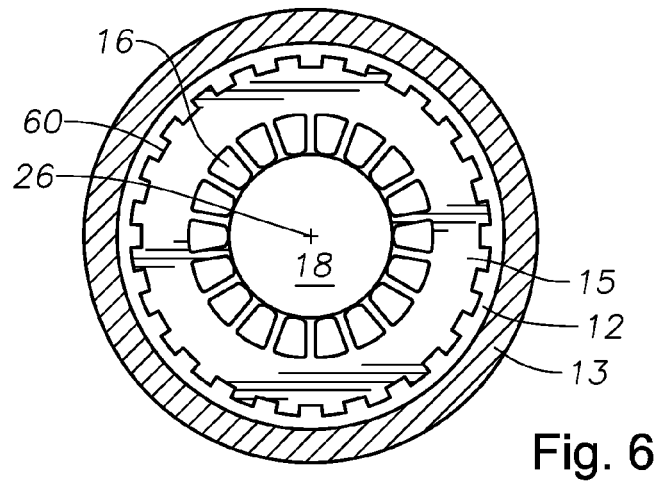
FIG. 6 shows a transverse sectional view of an additional embodiment of a motor assembly in accordance with the invention.

In another embodiment shown in FIG. 6, axially extending channels 60 could be cut into the outer diameter of stator 15 to increase the surface area with which the HTCM 14 comes in contact. Channels 60 could extend circumferentially around stator 15 and may extend the full axial length of stator 15. Channels 60 thus increase the volume of annular gap 12 and thereby increases the amount of HTCM 14 that may be used. Alternatively, channels 60 could be cut into the outer diameter of the stator 15 such that they extend helically, spirally or circumferentially.

Figure 7:
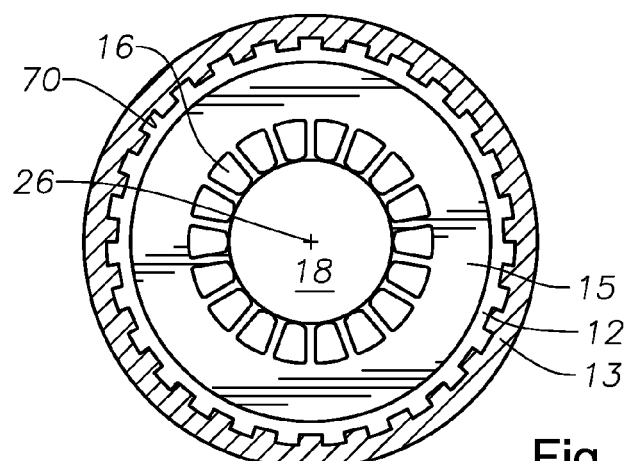
FIG. 7 shows a transverse sectional view of an additional embodiment of a motor assembly in accordance with the invention.

In another embodiment, as shown in FIG. 7, axially extending channels 70 could be cut into the inner diameter of housing 13 to increase the surface area with which the HTCM 14 comes in contact. Channels 70 extend circumferentially around the inner diameter of housing 13 and the full length of housing 13. Channels 70 also increase the volume of annular gap 12 and thereby increases the amount of HTCM 14 that may be used. Alternatively, channels 70 could be cut into the inner diameter of housing 13 such that they extend helically, spirally or circumferentially.

Figure 8:
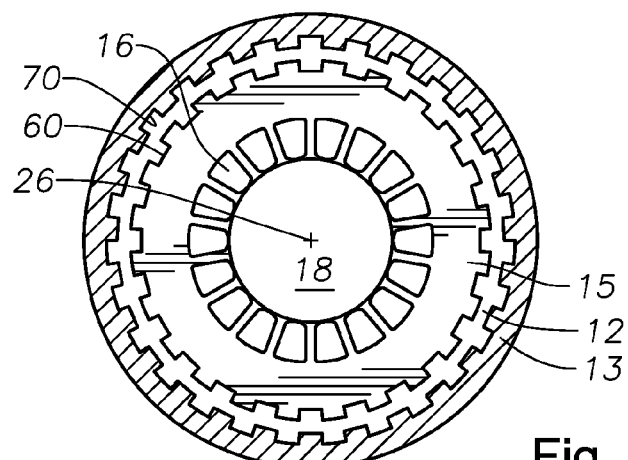
FIG. 8 shows a transverse sectional view of an additional embodiment of a motor assembly in accordance with the invention.

Referring to FIG. 8, channels 60 and 70 could be cut into both the exterior of stator 15 and the interior of housing 13, respectively to further increase the surface area with which the HTCM 14 comes in contact. In the embodiments of FIGS. 6-8, annular gap 12 still has the same width between the effective outer diameter of stator 15 and the effective inner diameter of housing 13 as in the embodiments of FIGS. 1-4.

In additional embodiments (not shown), the gap 12 is filled with other types of HTCMs such as a high silica content epoxy, diamond content epoxy, fiber, proppant, or ceramic. The gap 12 may also be filled with a combination of HTCMs.

Figure 5:
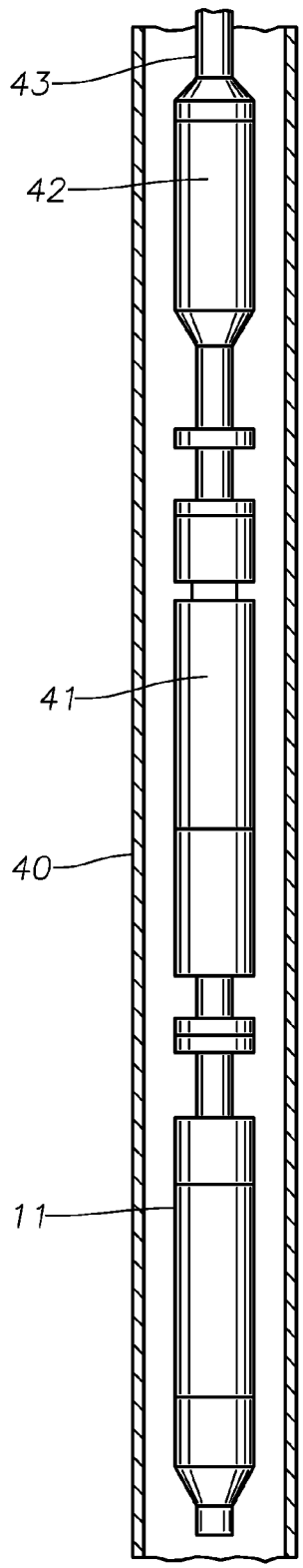
FIG. 5 is a side elevational view that shows the motor of FIG. 1 as part of a downhole system that includes a seal section and a pump, in accordance with the invention.

The motor 11 can function as part of a system in a well casing 40 as shown in FIG. 5. Motor 11 connects through seal section 41 to a pump 42 that discharges into string of tubing 43. Well fluid typically flows upward past motor 11 to the intake of pump 41.

By utilizing an HTCM 14 in the annular gap 12, such as thermal grease, high silica content epoxy, fiber, or ceramic, heat transfer from the rotor and stator to the housing 13 is greatly enhanced. Thus heat is removed more efficiently through the housing 13 and into the well fluid flowing past. The enhanced heat transfer can extend the life of the motor due to the lower operating temperature. Further, because the motor's internal temperature may be kept at generally the same operating temperature, the motor can reliably and efficiently operate in higher outside temperatures.

While the invention has been shown in only a few of its forms, it should be apparent to those skilled in the art that it is not so limited and is susceptible to various changes and modifications without departing from the scope of the invention.

What is claimed is:

1. A submersible pump assembly comprising:
a submersible pump;
an electrical motor filled with a dielectric lubricant;
a seal section connected between the motor and the pump for reducing a pressure differential between the lubricant in the motor and well fluid on an exterior of the assembly; the motor comprising:
a stator rigidly mounted within a housing, where a stator outer diameter and a housing inner diameter form an annular gap between the stator and the housing;
a rotor located within a central cavity of the stator, the rotor capable of rotation relative to the stator and being immersed in the lubricant; and
a high thermal conductivity material (HTCM) located in the gap between the stator outer diameter and the housing inner diameter, the HTCM having a different composition than the lubricant in the motor and being in fluid communication with the lubricant.

2. The assembly of claim 1, wherein the HTCM comprises at least one of the following:
 a.) a thermal grease;
 b.) a ceramic material; or
 c.) a proppant material.

3. The assembly of claim 1, wherein the lubricant has a lesser thermal conductivity than the HTCM.

4. The assembly of claim 1, further comprising:
at least one axially, helically, spirally, or circumferentially extending channel relative to an axis of the housing formed around the stator outer diameter and extending along a length or circumference of the stator; and
wherein the HTCM is contained within the at least one channel.

5. The assembly of claim 1, further comprising:
at least one axially, helically, spirally, or circumferentially extending channel relative to an axis of the housing formed around the housing inner diameter and extending along a length or circumference of the housing; and
wherein the HTCM is contained within the at least one channel.

6. The assembly of claim 1, further comprising:
at least one axially, helically, spirally, or circumferentially extending stator channel formed on and around the stator outer diameter;
at least one axially, helically, spirally, or circumferentially extending housing channel formed on and around the housing inner diameter; and
wherein the HTCM fills the at least one stator channel and the at least one housing channel.

7. The assembly of claim 1, wherein the lubricant and the HTCM are in contact with each other at upper and lower ends of the annular gap.

8. The assembly of claim 1, wherein the HTCM has a thermal conductivity in a range from 0.4 to 10 Btu/(hr·ft·° F.).

9. The assembly of claim 1, wherein the HTCM has a thermal conductivity of greater than 0.4 Btu/(hr·ft·° F.).

10. The assembly of claim 1, wherein the HTCM has a thermal conductivity of greater than 1.0 Btu/(hr·ft·° F.).

11. The assembly of claim 1, wherein the HTCM has a thermal conductivity of greater than 5.0 Btu/(hr·ft·° F.).

12. The assembly of claim 1, wherein the HTCM remains a liquid during normal operation of the assembly that has a greater viscosity than the lubricant.

13. The assembly of claim 1, wherein the gap has a radial width, relative to an axis of the housing, that is in the range from 0.0001 to 0.020 inch.

14. An electrical submersible pump system comprising:
a submersible pump;
a submersible electrical motor filled with a dielectric lubricant;
a seal section connected between the motor and the pump for reducing a pressure differential between the lubricant in the motor and well fluid on an exterior of the assembly;
the motor comprising:
a stator rigidly mounted within a housing, wherein a stator outer diameter and a housing inner diameter form an annular gap;
a rotor located within a central cavity of the stator, the rotor capable of rotation relative to the stator, the rotor being immersed in the lubricant;
a liquid high thermal conductivity material (HTCM) filling the gap between the stator outer diameter and the housing inner diameter; wherein
the HTCM has a higher thermal conductivity than the lubricant;
the HTCM remain a liquid during normal operation of the system that has a higher viscosity than the lubricant; and
the lubricant is in contact with the HTCM at upper and lower ends of the gap.

15. The system of claim 14, wherein the HTCM comprises a thermal grease.

16. The system of claim 14, further comprising:
at least one axially, helically, spirally, or circumferentially extending channel relative to an axis of the housing formed around the stator outer diameter and extending along a length or circumference of the stator; and
wherein the HTCM is contained within the at least one channel.

17. The system of claim 14, further comprising:
at least one axially, helically, spirally, or circumferentially extending channel relative to an axis of the housing formed around the housing inner diameter and extending along a length or circumference of the housing; and
wherein the HTCM is contained within the at least one channel.

18. The system of claim 14, further comprising:
at least one axially, helically, spirally, or circumferentially extending stator channel formed on and around the stator outer diameter;
at least one axially, helically, spirally, or circumferentially extending housing channel formed on and around the housing inner diameter; and
wherein the HTCM fills the at least one stator channel and the at least one housing channel.

19. A method for assembling a submersible pump motor, comprising:
(a) installing a stator within a housing, wherein a stator outer diameter and a housing inner diameter form between them an annular gap;
(b) flowing a high thermal conductivity material (HTCM) into the gap;
(c) mounting a rotatable rotor within the central cavity of the stator; and (d) flowing a lubricant into the central cavity and immersing the rotor, the lubricant being a different material than the HTCM and being in fluid communication with the HTCM.

20. The method of claim 19, wherein step (b) comprises isolating the gap from the central cavity of the stator while flowing the HTCM into the gap.

21. The method of claim 20, wherein the lubricant has less thermal conductivity than the HTCM.

22. The method of claim 19, wherein the HTCM comprises at least one of the following:
   a.) a thermal grease;
   b.) a ceramic material; or
   c.) a proppant material.

23. The method of claim 21, wherein the HTCM and the lubricant have interfaces with each other at upper and lower ends of the gap.

24. The method of claim 20, wherein the isolation of the gap from the central cavity is removed while performing the step of flowing the lubricant into the central cavity a submersible pump.

25. The method of claim 21, wherein the HTCM comprises a liquid that remains a liquid during normal operation of the motor having greater viscosity than the lubricant.

26. The method of claim 19, wherein step (b) comprises evacuating the annular gap, then pumping the HTCM into the annular gap.

* * * * *